US012784781B2

(12) United States Patent
Yi

(10) Patent No.: US 12,784,781 B2
(45) Date of Patent: Nov. 3, 2026

(54) VIDEO PROCESSING METHOD AND APPARATUS, AND NON-TRANSITORY COMPUTER-READABLE STORAGE MEDIUM

(71) Applicant: Lemon Inc., Grand Cayman (KY)

(72) Inventor: Tianya Yi, Beijing (CN)

(73) Assignee: Lemon Inc., Grand Cayman (KY)

( * ) Notice: Subject to any disclaimer, the term of this patent is extended or adjusted under 35 U.S.C. 154(b) by 173 days.

(21) Appl. No.: 18/589,073

(22) Filed: Feb. 27, 2024

(65) Prior Publication Data

US 2024/0290358 A1 Aug. 29, 2024

(30) Foreign Application Priority Data

Feb. 28, 2023 (CN) ........................ 202310183513.X

(51) Int. Cl.

| | |
|---|---|
| ***G11B 27/00*** | (2006.01) |
| ***G06F 3/0482*** | (2013.01) |
| ***G06F 3/0484*** | (2022.01) |
| ***G11B 27/036*** | (2006.01) |
| ***G11B 27/10*** | (2006.01) |
| *G11B 27/02* | (2006.01) |

(52) U.S. Cl.

CPC .......... *G11B 27/036* (2013.01); *G06F 3/0482* (2013.01); *G06F 3/0484* (2013.01); *G11B 27/005* (2013.01); *G11B 27/10* (2013.01)

(58) Field of Classification Search

CPC ....... G11B 27/036; G11B 27/00; G11B 27/02; G11B 27/029

USPC ................................. 386/239, 248, 278, 282

See application file for complete search history.

(56) References Cited

U.S. PATENT DOCUMENTS

| | | | | |
|---|---|---|---|---|
| 6,137,945 | A | 10/2000 | McGrath | |
| 6,580,870 | B1 * | 6/2003 | Kanazawa | H04N 21/4316 386/244 |
| 8,739,073 | B2 * | 5/2014 | Han | G06F 3/0485 715/776 |
| 10,219,027 | B1 * | 2/2019 | O'Neill | H04N 21/4312 |
| 2017/0286423 | A1 * | 10/2017 | Shorman | G06F 16/24578 |
| 2017/0300754 | A1 * | 10/2017 | Ohm | G06F 18/24317 |
| 2022/0270647 | A1 | 8/2022 | Xie | |
| 2023/0144094 | A1 | 5/2023 | Wu et al. | |

FOREIGN PATENT DOCUMENTS

| | | | |
|---|---|---|---|
| CN | 112073649 | A | 12/2020 |
| CN | 114758350 | A | 7/2022 |

* cited by examiner

*Primary Examiner* — Daquan Zhao

(74) *Attorney, Agent, or Firm* — BakerHostetler

(57) ABSTRACT

The present disclosure describes video processing techniques. The techniques comprises displaying a video presentation interface, the video presentation interface configured to present a video in a media stream; receiving an interactive operation performed on the video; in response to the interactive operation, entering a material presentation page of the video, wherein the material presentation page comprises a playback area of playing the video; and presenting at least one material presentation area on the material presentation page, the at least one material presentation area comprising related information of a plurality of first media materials forming the video.

20 Claims, 6 Drawing Sheets

VIDEO PROCESSING METHOD AND APPARATUS, AND NON-TRANSITORY COMPUTER-READABLE STORAGE MEDIUM

CROSS-REFERENCE TO RELATED APPLICATION

The present application claims priority to Chinese Patent Application No. 202310183513.X, filed on Feb. 28, 2023, which is incorporated herein by reference in its entirety.

BACKGROUND

Communication is increasingly being conducted using Internet-based tools. The Internet-based tools may be any software or platform. Existing social media platforms enable users to communicate with each other by sharing images and videos. As communication devices, such as mobile phones, become more sophisticated, people continue to desire new ways for video creation, social networking, and communication.

SUMMARY

The inventors of the present disclosure have found that the related art described above has the following problem: the distribution of the media materials contained in the video template is unclear, as a result, it is unable to clearly present characteristics of the video template.

In view of this, the present disclosure provides a video processing technical solution, capable of clearly presenting the characteristics of the video template.

According to some embodiments of the present disclosure, there is provided a video processing method, comprising: displaying a video presentation interface, the video presentation interface presenting a video in a media stream; receiving an interactive operation of a user for the video; in response to the interactive operation of the user for the video, entering a material presentation page of the video; and presenting at least one material presentation area on the material presentation page, the at least one material presentation area comprising related information of a plurality of first media materials forming the video.

According to other embodiments of the present disclosure, there is provided a video processing apparatus, comprising: a jumping unit configured to receive an interactive operation of a user for a video in a media stream, and in response to the interactive operation of the user for the video in the media stream, enter a material presentation page of the video; and a presentation unit configured to display a video presentation interface, and present at least one material presentation area on the material presentation page, the at least one material presentation area comprising related information of a plurality of first media materials forming the video, the video presentation interface presenting the video in the media stream.

According to still other embodiments of the present disclosure, there is provided a video processing apparatus, comprising: a memory; and a processor coupled to the memory, the processor being configured to perform, based on instructions stored in the memory, the video processing method in any of the above embodiments.

According to further embodiments of the present disclosure, there is provided a non-transitory computer-readable storage medium having thereon stored a computer program which, when executed by a processor, implements the video processing method in any of the above embodiments.

In the above embodiments, the material presentation page corresponding to the video is entered directly from the video viewed by the user, to present the distribution of the media materials contained in the video template corresponding to the video. In this way, the characteristics of the video template can be clearly presented.

BRIEF DESCRIPTION OF THE DRAWINGS

The accompanying drawings, which constitute a part of this specification, illustrate embodiments of the present disclosure and together with the description, serve to explain the principles of the present disclosure.

The present disclosure may be more clearly understood according to the following detailed description by referring to the accompanying drawings, in which.

DETAILED DESCRIPTION

Figure 1:
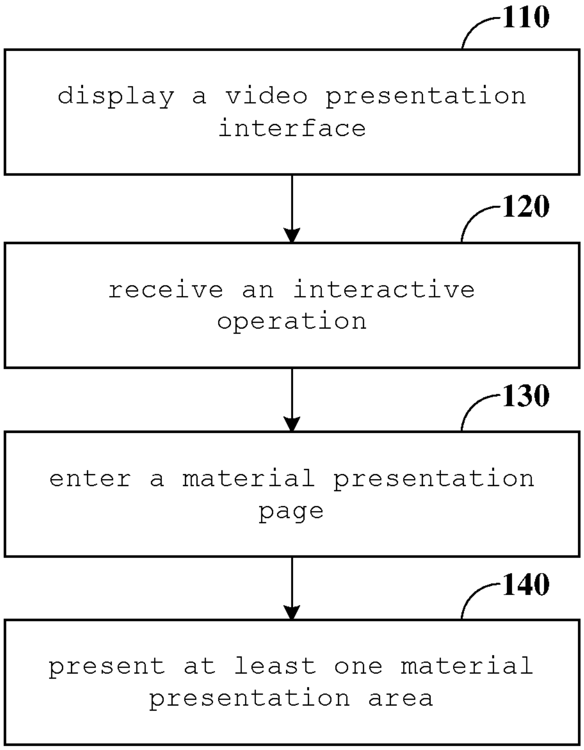
FIG. 1 illustrates a flow diagram of a video processing method according to some embodiments of the present disclosure.

Various exemplary embodiments of the present disclosure will now be described in detail with reference to the accompanying drawings. It should be noted that: the relative arrangements, numerical expressions and numerical values of components and steps set forth in these embodiments do not limit the scope of the present disclosure unless specifically stated otherwise.

Meanwhile, it should be understood that a size of each portion shown in the drawings is not drawn according to an actual scale for the convenience of description.

The following description of at least one exemplary embodiment is merely illustrative in nature and is in no way used as any limitation on this disclosure and its application or use.

Techniques, methods, and devices known to one of ordinary skill in the related art might not be discussed in detail, but the techniques, methods, and devices should be considered as part of the description where appropriate.

In all examples shown and discussed herein, any specific value should be construed as exemplary only and not as limiting. Therefore, other examples of the exemplary embodiment may have different values.

It should be noted that: similar reference numbers and letters refer to similar items in the following drawings, and thus, once a certain item is defined in one drawing, it need not be discussed further in subsequent drawings.

As previously described, the preview of the video template and the upload of the media material are implemented separately, that is, the two functions are put in two scenarios and not combined together. This results in the unclear distribution of the media materials contained in the video template, so that the characteristics of the video template cannot be clearly presented.

According to the present disclosure, the preview of the video template and the upload of the media materials are combined in one scenario to be implemented, which helps to better and conveniently understood the structural characteristics of the video template, thereby improving the effect of the video generated by the user according to the video template.

For example, the technical solutions of the present disclosure can be implemented by the following embodiments.

FIG. 1 illustrates a flow diagram of a video processing method according to some embodiments of the present disclosure.

As shown in FIG. 1, in step 110, a video presentation interface is displayed, the video presentation interface presenting a video in a media stream.

In step 120, an interactive operation of a user for the video is received.

In step 130, in response to the interactive operation of the user for the video in the media stream, a material presentation page of the video is entered. For example, the material presentation page comprises a material presentation area for presenting related information of a plurality of first media materials, and a playback area for playing back the video.

For example, the material presentation page comprises a playback area for playing back the video.

For example, the user is viewing a certain video in a pushed video stream, and by clicking a specified control on the video playback page, the user can enter a material presentation page for a video template adopted by the video. In this way, the user can, when viewing the video, quickly and clearly know formation and structure of the video template adopted by the video, thereby conveniently creating the video based on the video template of the video and improving the effect of the video creation function.

In step 140, at least one material presentation area on the material presentation page is presented, the at least one material presentation area comprising related information of a plurality of first media materials forming the video. For example, the related information comprises at least one of a number, a duration, or an arrangement order of the first media materials.

Figure 2A:
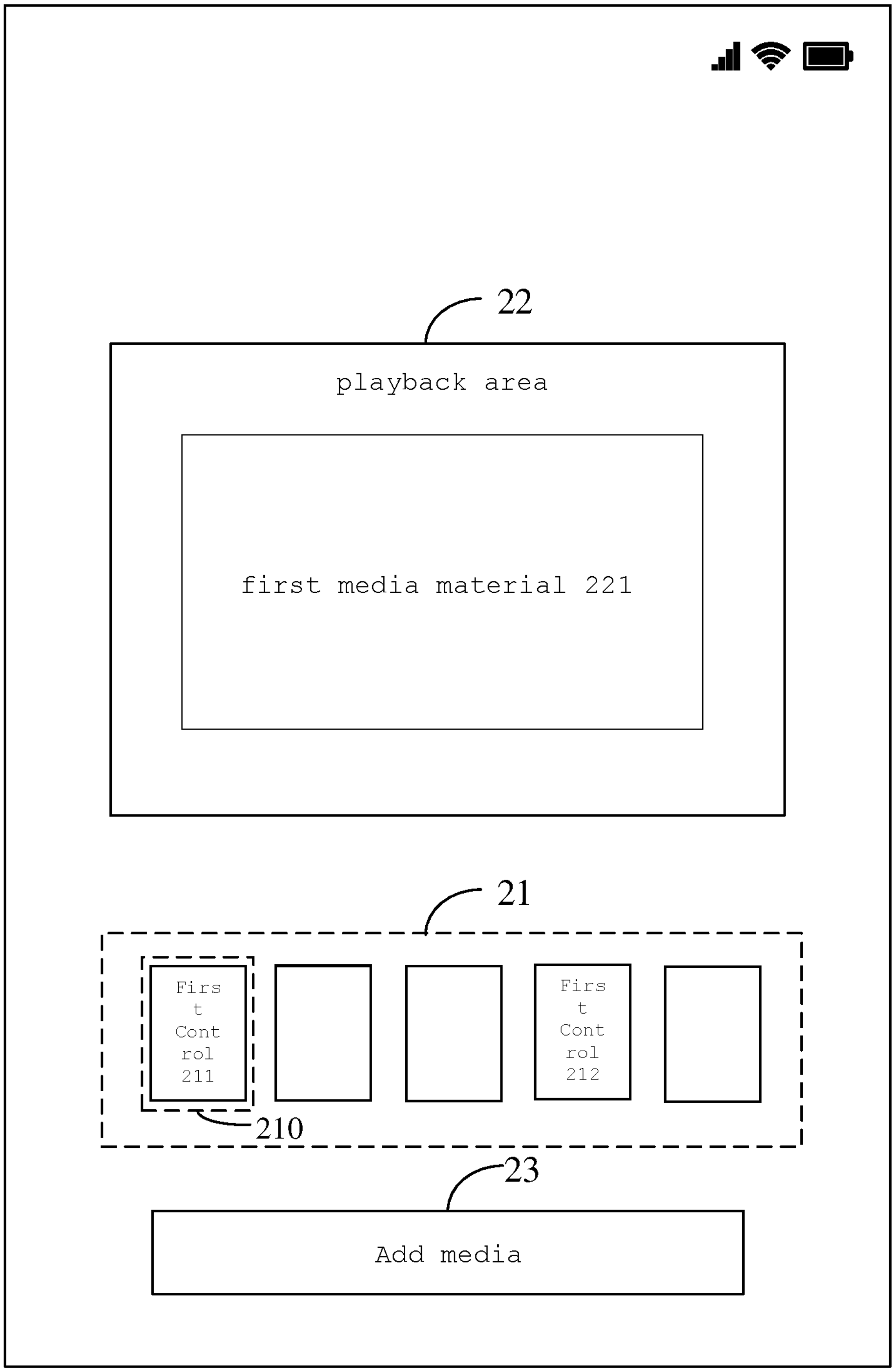
FIGS. 2*a* to 2*b* illustrate schematic diagrams of a material presentation page according to some embodiments of the present disclosure.
Figure 2B:
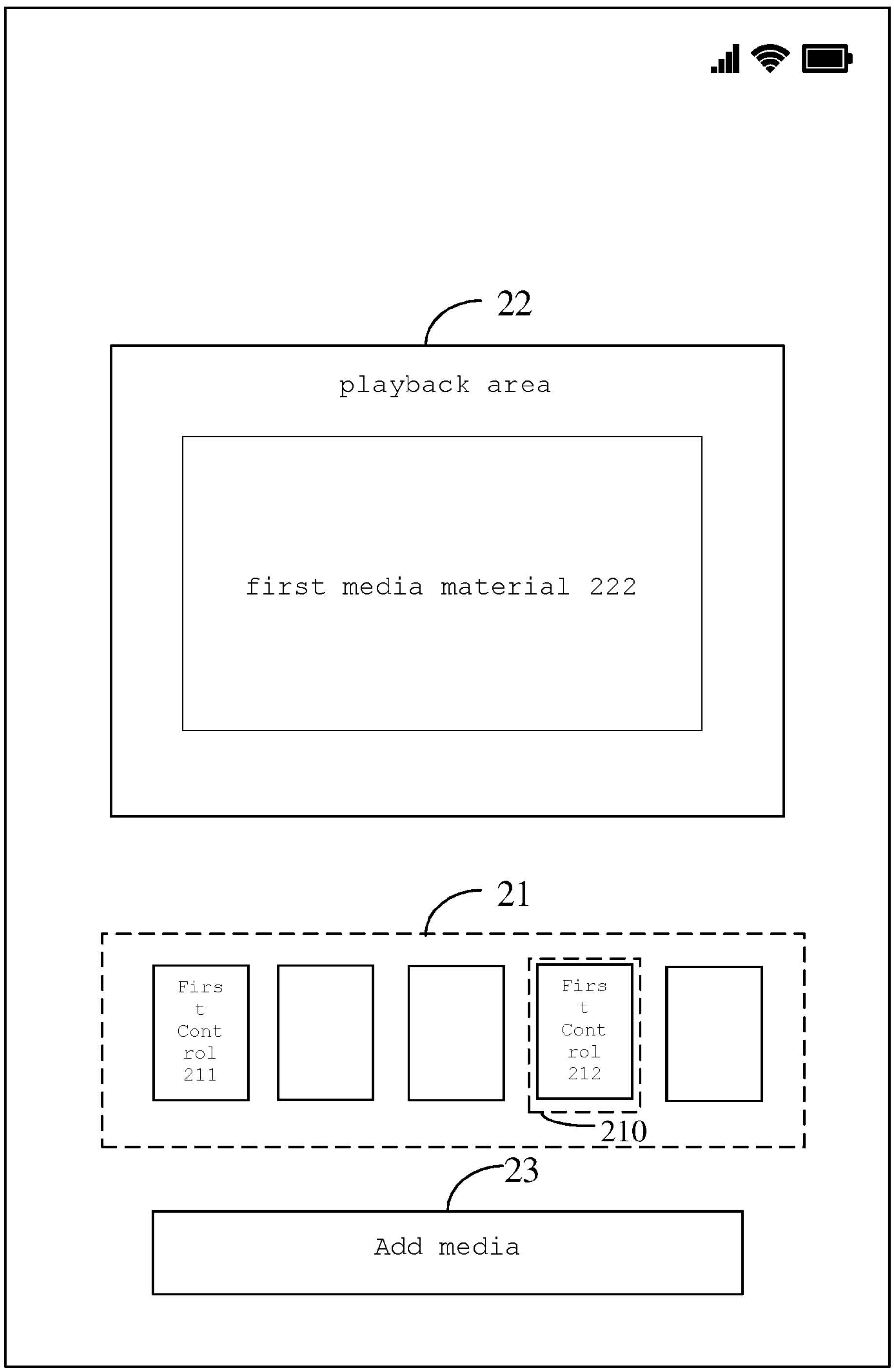

FIGS. 2*a* to 2*b* illustrates schematic diagrams of a material presentation page according to some embodiments of the present disclosure.

As shown in FIG. 2*a*, in some embodiments, in response to the user entering the material presentation page, the plurality of first media materials of the video are sequentially played back in a playback area 22 of the material presentation page. For example, the user can control the playback or pause by clicking the playback area 22. For example, in response to the user entering the material presentation page, the playback of the video automatically starts.

In some embodiments, in a material presentation area 21 of the material presentation page, a plurality of first controls are presented, each of the plurality of first control corresponding to one of the plurality of first media materials. For example, the plurality of first controls are arranged in an order in which the plurality of first media materials are played back in the video. For example, related information of a corresponding first media material can be presented on the first control.

For example, the first controls for replacing the media materials are sequentially displayed in an order of the media materials in a video template corresponding to the video.

In some embodiments, in response to the video being played back to a current first media material 221 of the video in the playback area 22 of the material presentation page, a first control 211 corresponding to the current first media material 221 is indicated by using a specified display mode. For example, a cursor 210 is positioned onto the first control 211 corresponding to the current first media material 221.

For example, as the video is played back, a position of the current first control or a position of the cursor is switched following the video playback progress.

In some embodiments, in the case where all of the first controls cannot be presented in the at least one material presentation area 21, the user may perform an interactive operation (e.g., swipe left/right, or clicking a corresponding control), to display, in the at least one material presentation area 21, a first control that cannot be currently displayed.

For example, in the case where there are a large number of first controls, all of the first controls may be viewed by a swipe left/right operation. While the swipe operation is performed, the video playback progress changes following the swipe operation; and the cursor may also move following the swipe operation.

As shown in FIG. 2*b*, in some embodiments, in response to an interactive operation of the user on a target first control 212, the playback progress in the playback area 22 of the material presentation page is switched to a first media material 222 corresponding to the target first control 212.

For example, in the case where the user swipes horizontally (i.e., starts swipe) in an area where the first control is located, the playback of the video is paused. In the case where the user releases his hand (i.e., stops swipe), the playback progress is anchored to a target first control selected by the cursor and a video playback state (continuing the playback or remaining the pause) before the swipe starts is kept.

In some embodiments, in the case where the video is being played back in the playback area 22 of the material presentation page, in response to the interactive operation of the user on the target first control 212, the playback of the video is paused; and in the playback area 22, starting from the first media material 222 corresponding to the target first control 212, the playback of the video is continued.

For example, in response to the user starting a swipe operation from the current first control 211, the playback of the video is paused; and in response to the user ending the swipe operation at the target first control 212, the playback of the video is continued. For example, if the video is played back, when the user performs an operation such as drag in an area where the first control is located, the playback of the video is paused; and when the user releases his hand, the playback of the video is continued.

In some embodiments, in the case where the playback of the video is paused in the playback area 22 of the material presentation page, in response to the interactive operation of the user on the target first control 212, the playback progress in the playback area 22 is paused at the first media material 222 corresponding to the target first control 212. For example, if the current playback of the video is paused, when the user performs an operation such as drag in an area where the first control is located, pausing the playback of the video is continued; and when the user releases his hand, continuing to pause the playback of the video.

For example, in response to the user ending the swipe operation at the target first control 212, the playback progress is paused at the first media material 222 corresponding to the target first control 212.

In some embodiments, a previous page (e.g., the video playback page in the video stream) may be returned to by selecting a return function (e.g., clicking a close button in an upper left corner of the material presentation page).

In some embodiments, the user may enter a filling-material stage by clicking a control 23 on the bottom of the material presentation page or clicking a symbol (e.g., a plus symbol, etc.) on the first control. For example, an upload button on the bottom of the page or a plus symbol on the first control is clicked to open an album page of the user; and the user may select or shoot a media material to insert the media material into the video template.

Figure 3:
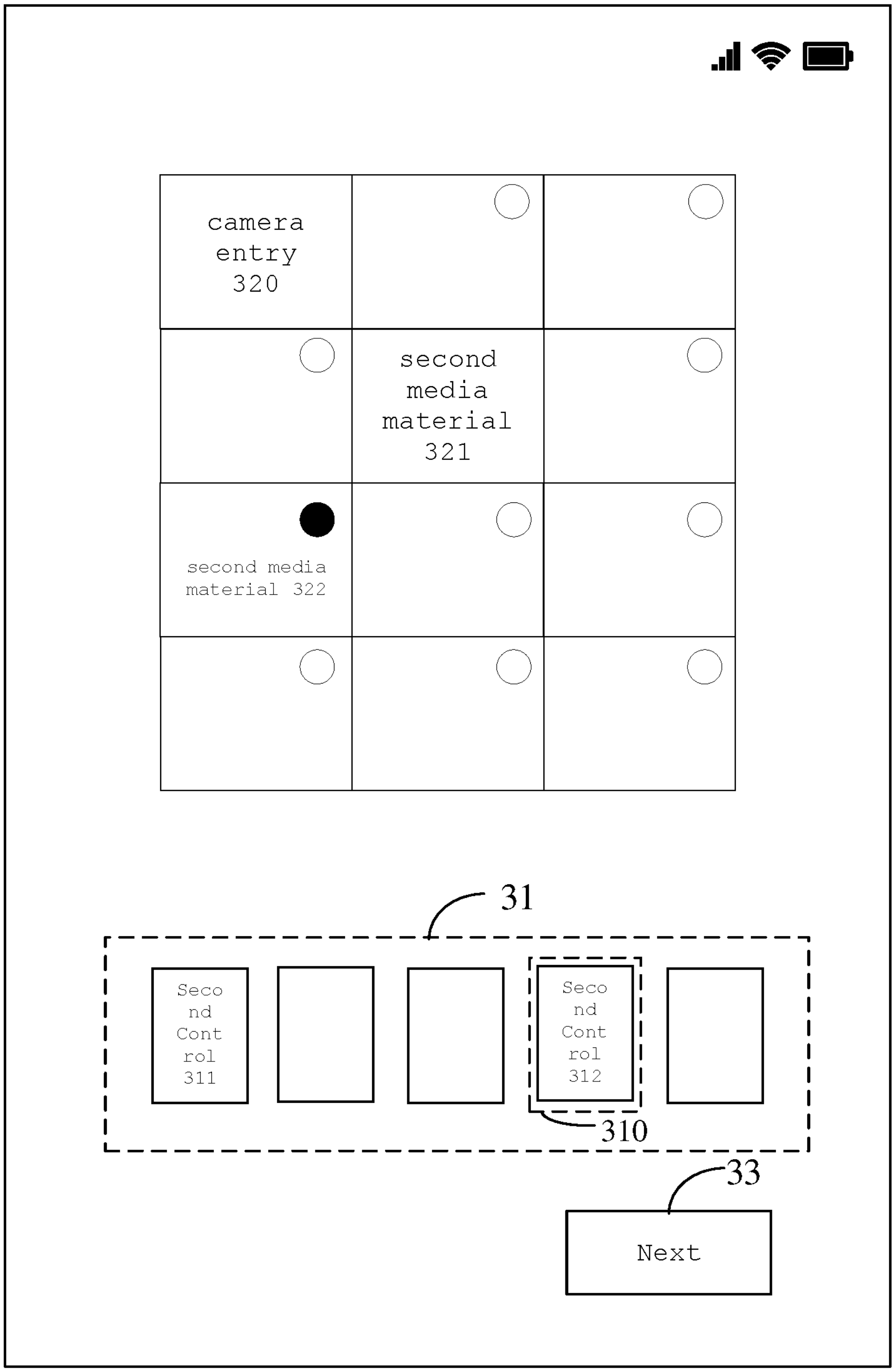
FIG. 3 illustrates a schematic diagram of a material upload page according to some embodiments of the present disclosure.

FIG. 3 illustrates a schematic diagram of a material upload page according to some embodiments of the present disclosure.

As shown in FIG. 3, in some embodiments, in response to the user selecting a material upload function on the material presentation page, a material upload page is entered, which comprises at least one second media material (a box with a circle control in FIG. 3), and a to-be-released video of the user is generated by using a selected second media material by the user on the material upload page.

For example, after an album page of the user is opened, media materials in the album are ordered by time (e.g., from latest to earliest); and a camera entry 320 may also be displayed on the album page, for triggering a shooting function.

In some embodiments, in response to the user selecting, on the material presentation page, a material upload function by a first control (e.g., the first control 212) corresponding to any first media material, the material upload page is entered, on which the user is instructed to select a second media material corresponding to related information of any first media material 222.

For example, the material upload page comprises a second control 312 corresponding to the first control 212. In response to the user selecting the material upload function on the first control 212, a cursor 310 is positioned onto the second control 312 corresponding to the first control 212.

For example, if the user enters an album page by clicking a first control in the material presentation page, the cursor is, on the material upload page, anchored to a position of a second control corresponding to the first control.

In some embodiments, in response to the user selecting, on the material presentation page, the material upload function by a third control 23, the material upload page is entered. For example, the third control 23 has no correspondence with the plurality of first media materials. The user is, on the material upload page, instructed to select in order the second media materials corresponding to the related information of the plurality of first media materials; and generate the to-be-released video based on a selection order of the second media materials.

For example, the material upload page comprises a plurality of second controls corresponding to the plurality of first media materials. The cursor 310 is moved onto the second control 312 corresponding to the current first media material (i.e., the first media material 222).

For example, if the user enters the album page by clicking an upload button on the bottom of the material presentation page, the cursor is, on the material upload page, anchored to a unfilled second control arranged in a first place among the unfilled second controls.

In some embodiments, by clicking an existing media material in an album on the album page, the user may insert the existing media material into the selected second control.

For example, by clicking any media material, the user may preview or select the media material. If a circle control at an upper right corner of a media material is clicked, the media material is selected, and the color of the circle control will change; and if an area outside the circle control on the media material is clicked, the media material is previewed.

For example, after any media material is selected by clicking, the selected media material is inserted into the second control currently selected by the cursor, and then the cursor is moved to a next blank second control in order.

In some embodiments, in the case where a duration of the selected second media material 322 is not matched with a duration of the corresponding first media material 222, the selected second media material 322 is processed so that a duration of the selected second media material 322 processed is matched with the duration of the corresponding first media material 222.

For example, in the case where the selected second media material 322 is a video material and the duration thereof is less than that of the corresponding first media material 222, the video material is subjected to slow-playback processing, so that a duration of the video material subjected to the slow-playback processing is equal to that of the corresponding first media material 222.

For example, in the case where the selected second media material 322 is a video material and the duration thereof is greater than that of the corresponding first media material, the video material is subjected to interception processing, so that a duration of the video material subjected to the interception processing is equal to that of the corresponding first media material 222.

For example, in the case where the selected second media material 322 is a video material and the duration thereof is greater than that of the corresponding first media material 222, in response to the user selecting a material editing control, an editing page is displayed; and the video material is subjected to interception processing according to a clip of the video material selected by the user on the editing page.

For example, in the case where the selected second media material 321 is a picture material, a display time of the picture material is set to the duration of the corresponding first media material 221.

For example, if a duration of a filled second media material is not matched with a duration of the first media material corresponding to the second control, when the duration of the second media material is less than that of the first media material, the second media material is uniformly slowed down to adapt to the duration of the first media material; when the duration of the second media material is greater than that of the first media material, a playback speed of the second media material is kept unchanged, and first few seconds (or first few minutes) of the second media material with a duration equal to that of the first media material is selected; when the second media material is a picture, its display duration is directly matched with the duration of the second media.

For example, in response to the user clicking an unfilled second control, the cursor is moved to the second control to fill it with the second media material. After all of the second controls are filled, the album page is set to gray (i.e., set to be non-interactable) in whole, so that in this case, the second media material may no longer be newly added and the cursor is no longer displayed.

In some embodiments, by clicking the camera entry 320, the page may jump to a shoot page of a camera to shoot the second media material for insertion into the selected second control.

For example, after the shoot page is entered, accompanying music of a first media material corresponding to the selected second control is brought into the page at the same time, and the accompanying music is set to gray and is irreplaceable.

For example, various shoot functions (e.g., filtering, parameter adjustment, and the like) that are originally present in the shoot page may be retained.

In some embodiments, by clicking a shoot button, shoot of the second media material starts. Only the shoot of the second media material having a duration corresponding to a duration (duration upper limit) of the second control may be supported. For example, after the shoot starts, the user cannot click the shoot button again to pause the shoot, and until the duration upper limit of the shoot is reached, the shoot is automatically interrupted; the current page stays on the shoot page and the shot second media material is circularly played back in the shoot page; after the shoot is finished, the user can click re-shoot or insert the shot second media material into the second control; if a re-shoot control is clicked, return to the above shooting process; and if a confirm control is clicked, return to the album page, and the currently shot second media material is inserted into the second control.

In some embodiments, the second media material that has already been inserted into the second control may be deleted. For example, a selection button (e.g., a circle in FIG. 3) on the second media material may be clicked, or a button on a second control filled with the second media material may be clicked to deselect the second media material; and the second control corresponding to the second media material is cleared, and a cursor on the second control is displayed. The cleared second control can be displayed centrally.

In some embodiments, a playback interval of the selected second media material may be adjusted. For example, in the case where the duration of the selected second media material is greater than a duration corresponding to the second control, a material editing button is displayed on the second control; the material editing button or the selected second media material is clicked to enter an editing page, to adjust the playback interval.

For example, a complete track of the second media material may be presented in the editing page, to play back selected clips in a selection box circularly; by dragging leftward/rightward the selection box, a selected playback interval can be switched.

In some embodiments, in response to the user confirming (e.g., perform an interactive operation on the control 33), on the material upload page, a plurality of specified second media materials (e.g., second media material 321, 322, etc.) corresponding to the related information of the plurality of first media materials, it is prompted in an area 31 where the plurality of second controls are located that the plurality of specified second media materials are being uploaded.

For example, display brightness of thumbnails of the plurality of specified second media materials in the area where the plurality of second controls are located is changed, to prompt that the plurality of specified second media materials are being uploaded. For example, the thumbnails may be highlighted in an arrangement order.

For example, in response to the user clicking a next button, it is determined whether all the current second controls are filled with the second media material; if all the second controls have not been completely filled yet, the user is, through a message box (such as a toast prompt), prompted not to be allowed to enter a next step; and if all the second controls have been filled, a special effect for prompting the user that the loading is in progress is presented, and the next step is entered to preview a generated video.

Figure 4:
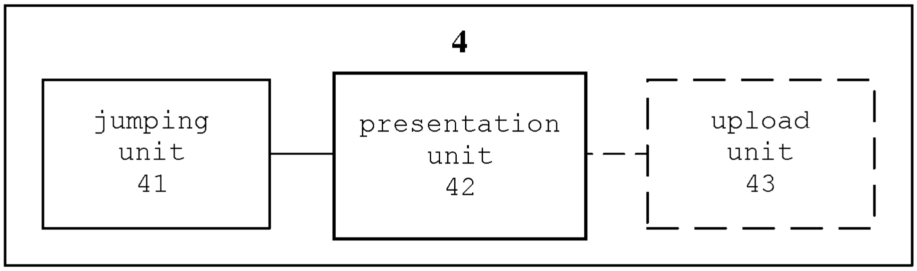
FIG. 4 illustrates a block diagram of a video processing apparatus according to some embodiments of the present disclosure.

FIG. 4 illustrates a block diagram of a video processing apparatus according to some embodiments of the present disclosure.

As shown in FIG. 4, the video processing apparatus 4 comprises: a jumping unit 41 configured to receive an interactive operation of a user for a video in a media stream, and in response to the interactive operation of the user for the video in the media stream, enter a material presentation page of the video; and a presentation unit 42 configured to display a video presentation interface, and present, on the material presentation page, related information of a plurality of first media materials forming the video, the video presentation interface presenting the video in the media stream.

In some embodiments, the jumping unit 41 enters, in response to the user selecting a material upload function on the material presentation page, a material upload page, which comprises at least one second media material. The video processing apparatus 4 further comprises an upload unit 43 configured to generate a to-be-released video of the user by using a selected second media material by the user on the material upload page.

In some embodiments, the material presentation page comprises a material presentation area for presenting the related information of the plurality of first media materials, and a playback area for playback of the video.

In some embodiments, the presentation unit 42 presents, in the at least one material presentation area of the material presentation page, a plurality of first controls, each of the plurality of first control corresponding to one of the plurality of first media materials.

In some embodiments, the plurality of first controls are arranged in an order in which the plurality of first media materials are played back in the video.

In some embodiments, the presentation unit 42 switches, in response to an interactive operation of the user on a target first control, playback progress in the playback area of the material presentation page to a first media material corresponding to the target first control.

In some embodiments, the presentation unit 42 pauses, in the case where the video is being played back in the playback area of the material presentation page, the playback of the video in response to the interactive operation of the user on the target first control; and continues, in the playback area, the playback of the video starting from the first media material corresponding to the target first control.

In some embodiments, the interactive operation comprises a swipe operation from a current first control to the target first control, the presentation unit 42 pausing the playback of the video in response to the user starting the swipe operation from the current first control, and continuing the playback of the video in response to the user ending the swipe operation at the target first control.

In some embodiments, the presentation unit 42 pauses, in the case of pausing the playback of the video in the playback area of the material presentation page, the playback progress in the playback area at the first media material corresponding to the target first control in response to the interactive operation of the user on the target first control.

In some embodiments, the interactive operation comprises a swipe operation from a current first control to the target first control, the presentation unit 42 pausing the playback progress at the first media material corresponding to the target first control in response to the user ending the swipe operation at the target first control.

In some embodiments, the presentation unit 42 indicates, in response to the video being played back to a current first media material of the video in the playback area of the material presentation page, a first control corresponding to the current first media material by using a specified display mode.

In some embodiments, the presentation unit 42 positions a cursor onto the first control corresponding to the current first media material.

In some embodiments, the presentation unit 42 presents, on any first control, related information of a first media material corresponding to the any first control.

In some embodiments, the presentation unit 42, in response to the user entering the material presentation page, plays back the plurality of first media materials of the video sequentially in the playback area of the material presentation page.

In some embodiments, the jumping unit 41 enters the material upload page in response to the user selecting, on the material presentation page, the material upload function by a first control corresponding to any first media material; and the upload unit 43 instructs, on the material upload page, the user to select a second media material corresponding to related information of the any first media material 222.

In some embodiments, the material upload page comprises a second control corresponding to the first control, the upload unit 43 positioning the cursor on the second control corresponding to the first control in response to the user selecting the material upload function on the first control.

In some embodiments, the jumping unit 41 enters the material upload page in response to the user selecting, on the material presentation page, the material upload function by a third control; and the upload unit 43 instructs, on the material upload page, the user to select the second media materials corresponding to the related information of the plurality of first media materials in order; and generates the to-be-released video based on a selection order of the second media materials.

In some embodiments, the material upload page comprises a plurality of second controls corresponding to the plurality of first media materials, the presentation unit 42 moving the cursor onto a second control corresponding to the current first media material.

In some embodiments, the upload unit 43 processes, in the case where a duration of the selected second media material is not matched with a duration of the corresponding first media material of the selected second media material, the selected second media material, so that a duration of the selected second media material processed is matched with the duration of the corresponding first media material.

In some embodiments, the presentation unit 42 performs at least one of: in the case where the selected second media material is a video material and the duration thereof is less than that of the corresponding first media material, performing slow playback processing on the video material, so that a duration of the video material after the slow playback processing is equal to that of the corresponding first media material; in the case where the selected second media material is a video material and the duration thereof is greater than that of the corresponding first media material, performing interception processing on the video material, so that a duration of the video material after the interception processing is equal to that of the corresponding first media material; or, in the case where the selected second media material is a picture material, setting a display time of the picture material to the duration of the corresponding first media material.

In some embodiments, the upload unit 43 displays, in the case where the selected second media material is a video material and the duration thereof is greater than that of the corresponding first media material, an editing page in response to the user selecting a material editing control; and performs interception processing on the video material according to a clip of the video material that is selected by the user on the editing page.

In some embodiments, the presentation unit 42 prompts, in response to the user confirming, on the material upload page, a plurality of specified second media materials corresponding to the related information of the plurality of first media materials, in an area where the plurality of second controls are located, that the plurality of specified second media materials are being uploaded.

For example, the presentation unit 42 changes display brightness of thumbnails of the plurality of specified second media materials in the area where the plurality of second controls are located, to prompt that the plurality of specified second media materials are being uploaded.

Figure 5:
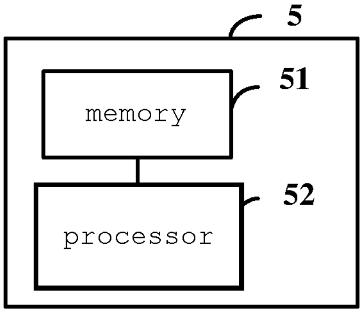
FIG. 5 illustrates a block diagram of a video processing apparatus according to other embodiments of the present disclosure.

FIG. 5 illustrates a block diagram of a video processing apparatus according to other embodiments of the present disclosure.

As shown in FIG. 5, the video processing apparatus 5 of this embodiment comprises: a memory 51 and a processor 52 coupled to the memory 51, the processor 52 being configured to perform, based on instructions stored in the memory 51, the video processing method in any of the embodiments of the present disclosure.

The memory 51 may comprise, for example, a system memory, a fixed non-transitory storage medium, and the like. The system memory has thereon stored, for example, an operating system, an application, a boot loader, a database, other programs, and the like.

Figure 6:
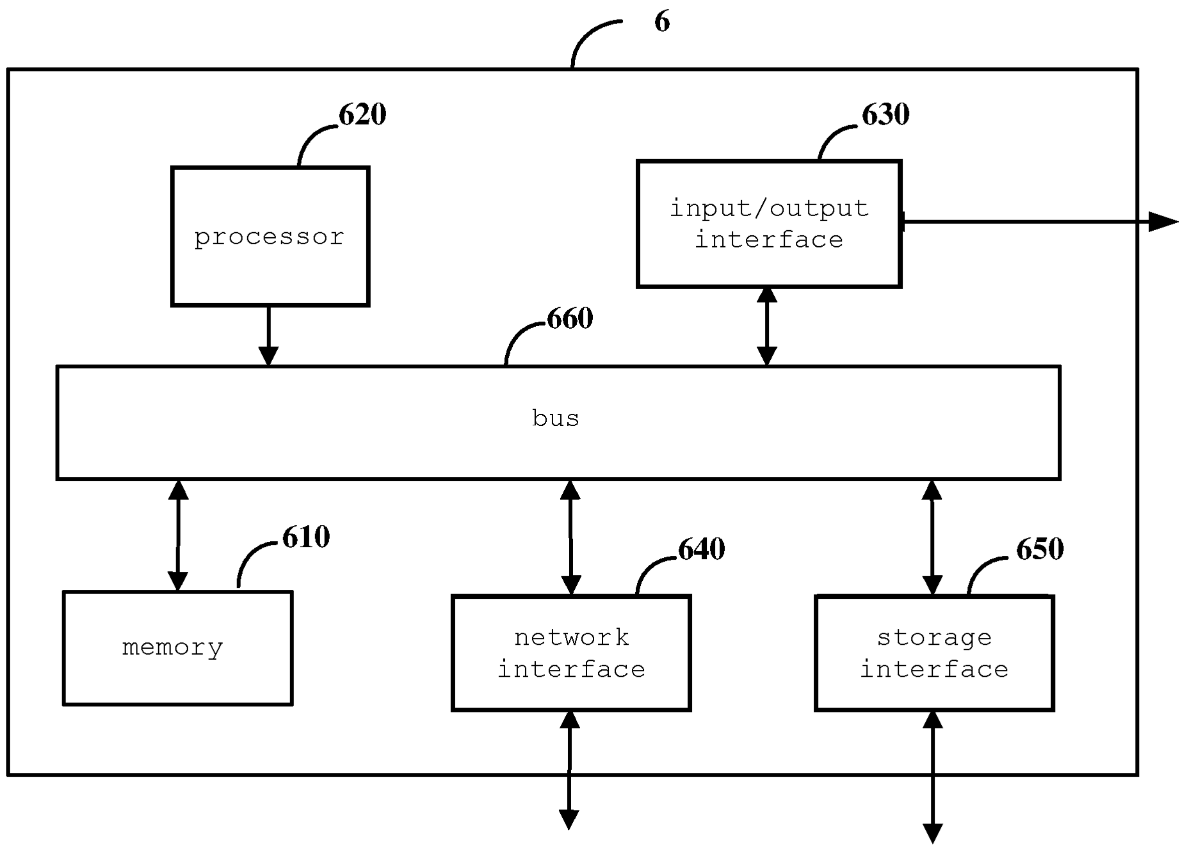
FIG. 6 illustrates a block diagram of a video processing apparatus according to still other embodiments of the present disclosure.

FIG. 6 illustrates a block diagram of the video processing apparatus according to still other embodiments of the present disclosure.

As shown in FIG. 6, the video processing apparatus 6 of this embodiment comprises: a memory 610 and a processor 620 coupled to the memory 610, the processor 620 being configured to perform, based on instructions stored in the memory 610, the video processing method in any of the foregoing embodiments.

The memory 610 may comprise, for example, a system memory, a fixed non-transitory storage medium, and the like. The system memory has thereon stored, for example, an operating system, an application, a bot loader, other programs, and the like.

The video processing apparatus 6 may further comprise an input/output interface 630, a network interface 640, a storage interface 650, and the like. These interfaces 630, 640, 650 and the memory 610 may be connected with the processor 620, for example, via a bus 660. The input/output interface 630 provides connection interfaces for input/output devices such as a display, a mouse, a keyboard, a touch screen, a microphone, and a loudspeaker. The network interface 640 provides connection interfaces for a variety of networking devices. The storage interface 650 provides connection interfaces for external storage devices such as an SD card and a USB flash disk.

It should be appreciated by those skilled in the art that, the embodiments of the present disclosure may be provided as a method, system, or computer program product. Accordingly, the present disclosure may take a form of an entire hardware embodiment, an entire software embodiment, or an embodiment combining software and hardware aspects. Moreover, the present disclosure may take a form of a computer program product implemented on one or more computer-usable non-transitory storage media (comprising, but not limited to, a disk memory, CD-ROM, optical memory, etc.) having computer-usable program code embodied therein.

So far, the video processing method, the video processing apparatus, and the non-transitory computer-readable storage medium according to the present disclosure have been described in detail. Some details well known in the art are not described in order to avoid obscuring the concepts of the present disclosure. Those skilled in the art can now fully appreciate how to implement the technical solutions disclosed herein, in view of the foregoing description.

The method and system of the present disclosure may be implemented in a number of ways. The method and system of the present disclosure may be implemented, for example, by software, hardware, firmware, or any combination of software, hardware, and firmware. The above order for the steps of the method is for illustration only, and the steps of the method of the present disclosure are not limited to the order specifically described above unless specifically stated otherwise. Furthermore, in some embodiments, the present disclosure may further be implemented as programs recorded in a recording medium, the programs comprising machine-readable instructions for implementing the method according to the present disclosure. Therefore, the present disclosure further covers a recording medium storing a program for performing the method according to the present disclosure.

Although some specific embodiments of the present disclosure have been described in detail by examples, it should be understood by those skilled in the art that the above examples are for illustration only and are not intended to limit the scope of the present disclosure. Those skilled in the art should appreciate that modifications may be made to the above embodiments without departing from the scope and spirit of the present disclosure. The scope of the present disclosure is defined by the attached claims.

What is claimed is:

1. A method of processing videos, comprising:

displaying a video presentation interface, the video presentation interface configured to present a video in a media stream;

receiving an interactive operation performed on the video;

entering a material presentation page of the video in response to the interactive operation on the video, wherein the material presentation page comprises a playback area of playing the video;

presenting at least one material presentation area on the material presentation page, the at least one material presentation area comprising related information of a plurality of first media materials that form the video;

presenting, in the at least one material presentation area, a plurality of first controls, each of the plurality of first controls corresponding to one of the plurality of first media materials;

wherein the method further comprises:

entering a material upload page in response to selecting a material upload function on the material presentation page, wherein the material upload page comprises at least one second media material; and generating a to-be-released video in response to detecting a selection of a second media material from the at least one second media material; and processing the selected second media material to implement a duration of the selected second media material matching a duration of a first media material corresponding to the selected second media material in response to determining that an original duration of the selected second media material does not match the duration of the first media material corresponding to the selected second media material.

2. The method according to claim 1, further comprising:

displaying the plurality of first controls in an order in which the plurality of first media materials are played back in the video.

3. The method according to claim 1, further comprising:

in response to receiving an interactive operation on a target first control among the plurality of first controls, switching a playback progress in the playback area of the material presentation page to a first media material corresponding to the target first control.

4. The method according to claim 3, wherein the interactive operation comprises a swipe operation from a current first control to the target first control, wherein the method further comprises:

pausing the playback of the video in response to determining that the swipe operation starts from the current first control; and switching the playback progress of the video from a media material corresponding to the current first control to the first media material corresponding to the target first control in response to determining that the swipe operation ends at the target first control.

5. The method according to claim 4, further comprising:

pausing the playback progress at the first media material corresponding to the target first control.

6. The method according to claim 1, further comprising:

in response to determining that the video is played back to a current first media material in the playback area of the material presentation page, indicating a first control corresponding to the current first media material in a specified manner.

7. The method according to claim 6, wherein the indicating a first control corresponding to the current first media material in a specified manner further comprises:

positioning a cursor onto the first control corresponding to the current first media material.

8. The method according to claim 1, further comprising:

presenting, on any first control among the plurality of first controls, related information of a first media material among the plurality of first media materials corresponding to the any first control.

9. The method according to claim 1, wherein the entering a material upload page further comprises:

entering the material upload page in response to selecting the material upload function via a first control corresponding to one of the plurality of first media materials.

10. The method according to claim 9, wherein the material upload page comprises a second control corresponding to the first control, and wherein the method further comprises:

positioning a cursor on the second control corresponding to the first control in response to selecting the material upload function via the first control.

11. The method according to claim 1, wherein the at least one second media material comprises a plurality of second media materials, and wherein the method further comprises:

entering the material upload page in response to selecting, on the material presentation page, the material upload function via a third control; and generating the to-be-released video based on a selection order of selecting at least a subset of the plurality of second media materials.

12. The method according to claim 1, wherein the material upload page comprises a plurality of second controls corresponding to the plurality of first media materials, and the method further comprises:

moving a cursor onto a second control corresponding to a current first media material.

13. The method according to claim 1, wherein the processing the selected second media material further comprises at least one of: in response to determining that the selected second media material is a video material of which an original duration is less than the duration of the first media material corresponding to the selected second media material, performing slow playback processing on the video material to implement that a duration of the video material after the slow playback processing is equal to the duration of the first media material corresponding to the selected second media material;

in response to determining that the selected second media material is a video material of which an original duration is greater than the duration of the first media material corresponding to the selected second media material, performing interception processing on the video material to implement that a duration of the video material after the interception processing is equal to the duration of the first media material corresponding to the selected second media material; or in response to determining that the selected second media material is a picture material, setting a time period of displaying the picture material to match the duration of the first media material corresponding to the selected second media material.

14. The method according to claim 13, wherein the performing interception processing on the video material further comprises:

displaying an editing page in response to selecting a material editing control in response to determining that the selected second media material is the video material of which the original duration is greater than the duration of the first media material corresponding to the selected second media material; and performing the interception processing on the video material according to a clip of the video material selected on the editing page.

15. The method according to claim 1, further comprising:

changing display brightness of a thumbnail of the at least one second media material in the area where the at least one second control is located to prompt that the at least one second media material is being uploaded.

16. A computing device for processing video, comprising:

a memory, and a processor coupled to the memory storing instructions that, upon execution by the processor, cause the process to perform operations, the operations comprising:

displaying a video presentation interface, the video presentation interface configured to present a video in a media stream;

receiving an interactive operation performed on the video;

entering a material presentation page of the video in response to the interactive operation on the video, wherein the material presentation page comprises a playback area of playing the video;

presenting at least one material presentation area on the material presentation page, the at least one material presentation area comprising related information of a plurality of first media materials that form the video;

presenting, in the at least one material presentation area, a plurality of first controls, each of the plurality of first controls corresponding to one of the plurality of first media materials;

wherein the operations further comprise:

entering a material upload page in response to selecting a material upload function on the material presentation page, wherein the material upload page comprises at least one second media material;

generating a to-be-released video in response to detecting a selection of a second media material from the at least one second media material; and processing the selected second media material to implement a duration of the selected second media material matching a duration of a first media material corresponding to the selected second media material in response to determining that an original duration of the selected second media material does not match the duration of the first media material corresponding to the selected second media material.

17. The computing device according to claim 16, the operations further comprising:

in response to receiving an interactive operation on one of the plurality of first controls, switching a playback progress in the playback area of the material presentation page to one of the plurality of first media materials corresponding to the one of the plurality of first controls.

18. The computing device according to claim 16, the operations further comprising:

in response to determining that the video is played back to a current first media material in the playback area of the material presentation page, indicating a first control corresponding to the current first media material in a specified manner.

19. The computing device according to claim 16, the operations further comprising:

presenting, on any first control among the plurality of first controls, related information of a first media material among the plurality of first media materials corresponding to the any first control.

20. The computing device according to claim 16, wherein the at least one second media material comprises a plurality of second media materials, and wherein the operations further comprise:

entering the material upload page in response to selecting, on the material presentation page, the material upload function via a third control; and generating the to-be-released video based on a selection order of selecting at least a subset of the plurality of second media materials.

* * * * *